United States Patent
Singh et al.

(10) Patent No.: US 7,655,610 B2
(45) Date of Patent: Feb. 2, 2010

(54) BLOWING AGENT COMPOSITIONS COMPRISING FLUORINATED OLEFINS AND CARBON DIOXIDE

(75) Inventors: Rajiv R. Singh, Getzville, NY (US); Ian Shankland, Randolph, NJ (US)

(73) Assignee: Honeywell International Inc., Morristown, NJ (US)

( * ) Notice: Subject to any disclaimer, the term of this patent is extended or adjusted under 35 U.S.C. 154(b) by 175 days.

(21) Appl. No.: 10/837,521

(22) Filed: Apr. 29, 2004

(65) Prior Publication Data

US 2005/0241805 A1 Nov. 3, 2005

(51) Int. Cl.
*C11D 7/50* (2006.01)

(52) U.S. Cl. .................... 510/408; 510/412

(58) Field of Classification Search .......... 252/67; 510/408, 412
See application file for complete search history.

(56) References Cited

U.S. PATENT DOCUMENTS

| | | | |
|---|---|---|---|
| 3,723,318 A | | 3/1973 | Butler |
| 3,872,682 A | * | 3/1975 | Shook .................. 62/114 |
| 3,884,828 A | | 5/1975 | Butler |
| 4,173,654 A | * | 11/1979 | Scherer .................. 514/759 |
| 4,465,786 A | | 8/1984 | Zimmer et al. |
| 4,788,352 A | | 11/1988 | Smutny .................. 570/153 |
| 4,798,818 A | | 1/1989 | Baizer et al. |
| 4,945,119 A | | 7/1990 | Smits et al. |
| 5,019,632 A | * | 5/1991 | Slocum et al. .................. 526/68 |
| 5,696,306 A | | 12/1997 | Ide et al. |
| 5,714,083 A | | 2/1998 | Turner |
| 5,728,315 A | * | 3/1998 | Singh et al. .................. 252/67 |
| 5,736,063 A | | 4/1998 | Richard et al. .................. 252/67 |
| 5,744,052 A | * | 4/1998 | Bivens .................. 252/67 |
| 5,766,503 A | * | 6/1998 | Shiflett et al. .................. 252/67 |
| 5,912,279 A | * | 6/1999 | Hammel et al. .................. 521/146 |
| 6,041,620 A | * | 3/2000 | Olszewski et al. .................. 62/612 |
| 6,076,372 A | * | 6/2000 | Acharya et al. .................. 62/606 |
| 6,103,844 A | * | 8/2000 | Brothers .................. 526/218.1 |
| 6,111,150 A | | 8/2000 | Sakyu et al. |
| 6,112,550 A | * | 9/2000 | Bonaquist et al. .................. 62/646 |

(Continued)

FOREIGN PATENT DOCUMENTS

EP   0398147 A2   11/1990

(Continued)

OTHER PUBLICATIONS

U.S. Appl. No. 10/694,272, filed Oct. 27, 2003; Process for Producing Fluoropropenes; Merkel et al.

(Continued)

*Primary Examiner*—Gregory E Webb
(74) *Attorney, Agent, or Firm*—Colleen D. Szuch

(57) ABSTRACT

Disclosed are compositions useful in a wide variety of applications, including as blowing agents. The preferred blowing agents comprise from about 1 to about 40 percent, on a weight basis, of carbon dioxide ($CO_2$) and from about 99 to about 60 percent, on a weight basis, of a compound having the Formula I $XCF_zR_{3-z}$ (I), where X is a $C_2$ or a $C_3$ unsaturated, substituted or unsubstituted, alkyl radical, each R is independently Cl, F, Br, I or H, and z is 1 to 3. A preferred compound of Formula I is tetrafluoropropene, particularly 1,1,1,3-tetrafluoropropene.

5 Claims, 4 Drawing Sheets

U.S. PATENT DOCUMENTS

| | | | |
|---|---|---|---|
| 6,125,656 A * | 10/2000 | Arman et al. | 62/647 |
| 6,176,102 B1 * | 1/2001 | Novak et al. | 62/612 |
| 6,327,866 B1 * | 12/2001 | Novak et al. | 62/114 |
| 6,516,837 B2 | 2/2003 | Thomas et al. | 141/67 |
| 6,526,764 B1 * | 3/2003 | Singh et al. | 62/84 |
| 6,881,354 B2 * | 4/2005 | Arman et al. | 252/67 |
| 7,534,366 B2 | 5/2009 | Singh et al. | |
| 2002/0032356 A1 * | 3/2002 | Gelblum et al. | 570/123 |
| 2004/0084652 A1 * | 5/2004 | Singh et al. | 252/75 |
| 2004/0119047 A1 * | 6/2004 | Singh et al. | 252/71 |
| 2004/0256594 A1 * | 12/2004 | Singh et al. | 252/71 |
| 2006/0043330 A1 * | 3/2006 | Wilson et al. | 252/67 |

FOREIGN PATENT DOCUMENTS

| | | |
|---|---|---|
| EP | 974571 A2 | 1/2000 |
| GB | 950876 | 2/1964 |
| JP | 04-110388 A | 4/1992 |
| WO | 98/50331 A1 | 11/1998 |

OTHER PUBLICATIONS

U.S. Appl. No. 10/694,273, filed Oct. 27, 2003; Compositions Containing Fluorine Substituted Olefins; Singh at al.

U.S. Appl. No. 10/695,212, filed Oct. 27, 2003; Fluorinated Alkene Refrigerant Compositions; Thomas et al.

U.S. Appl. No. 23/889,379, filed May 2, 1959, Ruh, et al.

* cited by examiner

US 7,655,610 B2

BLOWING AGENT COMPOSITIONS COMPRISING FLUORINATED OLEFINS AND CARBON DIOXIDE

CROSS REFERENCE TO RELATED APPLICATIONS

The present application is also related to and incorporates by reference each of the following pending United States Patent Applications: U.S. application Ser. Nos. 10/694,273 (now U.S. Pat. No. 7,534,366), filed Oct. 27, 2003; application Ser. No. 10/695,212 (now abandoned), filed Oct. 27, 2003; and application Ser. No. 10/694,272 (now U.S. Pat. No. 7,230,146), filed Oct. 27, 2003.

The present application is related to and claims the priority benefit of the following U.S. Provisional Applications, each of which is filed concurrently herewith and incorporated herein by reference: U.S. Provisional Application Nos. 60/567,427, 60/567,425, 60/567,428, 60/567,426, and application Ser. No. 60/567,429, each entitled "Processes for Synthesis of 1,3,3,3-tetrafluoropropene."

The present application is related to and claims the priority benefit of the following regular U.S. Applications, each of which is filed concurrently herewith and incorporated herein by reference: U.S. application Ser. No. 10/837,526, entitled "Azeotrope-like Compositions Of Tetrafluoropropene and Carbon Dioxide."

FIELD OF THE INVENTION

This invention relates to heat transfer fluids, and in particular heat transfer fluids containing C3 fluoroolefins, particularly trans-1,3,3,3-tetrafluoropropene (HFO-1234ze) and carbon dioxide (CO2).

BACKGROUND OF THE INVENTION

It is desirable in many different situations to selectively transfer heat between a fluid and a body to be cooled or warmed. As used herein, the term "body" refers not only to solid bodies but also other fluid materials, which take the shape of the container in which they exist.

One well known system for achieving such transfer of heat achieves cooling of a body by first pressurizing a vapor phase heat transfer fluid and then expanding it through a Joule-Thomson expansion element, such as a valve, orifice, or other type of flow constriction. Any such device will be referred to hereinafter simply as a Joule-Thompson "expansion element," and systems using such an element are sometimes referred to herein as Joule-Thompson systems. In most Joule-Thomson systems, single component, non-ideal gasses are pressurized and then expanded through a throttling component or expansion element, to produce isenthalpic cooling. The characteristics of the gas used, such as boiling point, inversion temperature, critical temperature, and critical pressure effect the starting pressure needed to reach a desired cooling temperature. While such characteristics are all generally well known and/or relatively easy to predict with an acceptable degree of certainty for single component fluids, this is not necessarily the case for multi-component fluids Because of the large number of properties or characteristics, which are relevant to the effectiveness and desirability of a heat transfer fluid, it is frequently difficult to predict in advance how any particular multi-component fluid will perform as a heat transfer fluid. For example, U.S. Pat. No. 5,774,052—Bivens discloses a combination of difluoroethane (HFC-32), pentafluoroethane (HFC-125) and a small amount (i.e., up to 5% by weight) of carbon dioxide (CO2) in the form of an azeotropic fluid that is said to have advantages as a refrigerant in certain applications. More particularly, the multi-component fluid of Bivens is said to be non-flammable and, due to its azeotropic nature, to undergo relatively little fractionation upon vaporization. Furthermore, the fluids of Bivens are comprised of relatively highly-fluorinated compounds, which are potentially environmentally damaging from a global warming perspective. In addition, obtaining fluids with azeotropic properties can sometimes add significantly to the cost of such fluids when used as refrigerants.

U.S. Pat. No. 5,763,063—Richard et al. discloses a non-azeotropic combination of various hydrocarbons, including HFC-32, and carbon dioxide which form a fluid said to be acceptable as replacements for chlorotrans-1,3,3,3-tetrafluoropropene (HCFC-22). In particular, the Richard et al. patent teaches that the vapor pressure of this fluid is substantially equal to HCFC-22, which is only about 83 psia. Therefore, while the fluid of Richard et al. is expected to perform well in certain refrigeration applications, it may be considered inadequate in the same types of applications mentioned above with respect to the Bivens fluid.

SUMMARY OF THE INVENTION

Applicants have discovered heat transfer fluids which possess a highly desirable and unexpectedly superior combination of properties, and heat transfer systems and methods based on these fluids. In preferred embodiments, the fluids of the present invention possess properties that have heretofore been associated with CFCs, including chemical stability, low toxicity, non-flammability, and efficiency in-use, while at the same time substantially reducing or eliminating the deleterious ozone depletion potential of such refrigerants. In addition, the preferred embodiments of the present invention provide refrigerants, which also substantially reduce or eliminate the negative global warming effects associated with many previously used heat transfer fluids. This difficult to achieve combination of characteristics is important, for example, in low temperature air conditioning, refrigeration and heat pump applications.

The present invention thus provides a heat transfer fluid comprising from about 1 to about 40 percent, on a weight basis, of carbon dioxide ($CO_2$) and from about 99 to about 60 percent, on a weight basis, of a compound having the Formula I $XCF_zR_{3-z}$ (I), where X is a $C_2$ or a $C_3$ unsaturated, substituted or unsubstituted, alkyl radical, each R is independently Cl, F, Br, I or H, and z is 1 to 3. In preferred embodiments, the Formul I compound is tetrafluoropropene, more preferably 1,1,1,3-tetrafluoropropene, and even more preferably trans-1,1,1,3-tetrafluoropropene (HFO-1234ze). Compounds of Formula I are disclosed in copending U.S. patent application Ser. No. 10/694,273, which is incorporated herein by reference. For the preferable embodiments, the heat transfer fluid preferably comprises from about 5 to about 30 percent by weight of carbon dioxide ($CO_2$) and from about 95 to about 70 percent by weight of Formula I compound, preferably HFO-1234ze. The preferred fluids of the present invention have a vapor pressure of at least about 30 psia at 35° F. The fluids are also preferably not azeotropic.

DETAILED DESCRIPTION OF PREFERRED EMBODIMENTS

The Heat Transfer Fluids

Figure 1:
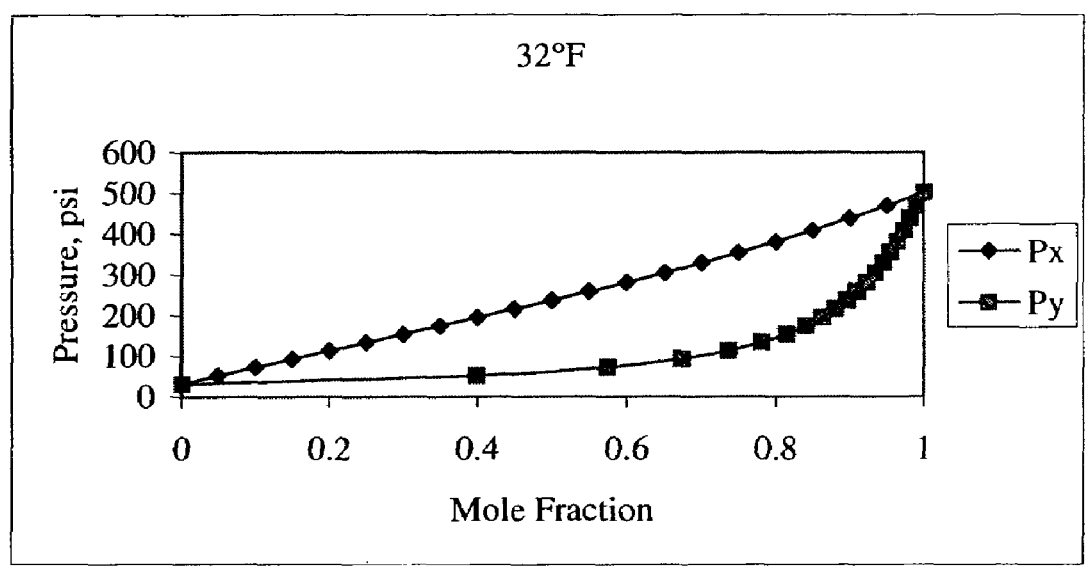
FIG. 1 is a graphical representation of the dew and bubble points of certain embodiments of the compositions of the present invention at 32° F.

The preferred heat transfer fluids comprise, and preferably consist essentially of, HFO-1234ze and $CO_2$. The relative amount of the hydrofluoroolefin used in accordance with the present invention is preferably selected to produce a heat transfer fluid which has the required refrigeration capacity and preferably is at the same time non-flammable. As used herein, the term non-flammable refers to a fluid which is non-flammable in all proportions in air as measured by ASTM E-681.

In certain embodiments, such as those in which both performance and non-flammability are especially important, it is preferred that the heat transfer fluid comprise, and preferably consist of, from about 1 to about 40 wt % $CO_2$ and from about 99 to about 60 wt. % Formula I compound, preferably HFO-1234ze, with fluids comprising from about 5 to about 35 wt. % $CO_2$ and from about 95 to about 65 wt % HFO-1234ze, being even more preferred. In highly preferred embodiments, the heat transfer fluid consists essentially of, and in certain embodiments consists of, HFO-1234ze and $CO_2$.

The heat transfer fluids of the present invention are adaptable for use in a wide variety of heat transfer applications, and all such applications are within the scope of the present invention. The present fluids find particular advantage and unexpectedly beneficial properties in connection with applications that require and/or can benefit from the use of highly efficient, non-flammable refrigerants that exhibit low or negligible global warming effects, and low or no ozone depletion potential. The present fluids also provide advantage to low temperature refrigeration applications, such as those in which the refrigerant is provided at a temperature of about −20° C. or less and which have relatively high cooling power. The preferred heat transfer fluids are highly efficient in that they exhibit a coefficient of performance (COP) that is high relative to the COP of the individual components of the fluid and/or relative to many refrigerants which have previously been used. The term COP is well known to those skilled in the art and is based on the theoretical performance of a refrigerant at specific operating conditions as estimated from the thermodynamic properties of the refrigerant using standard refrigeration cycle analysis techniques. See, for example, "Fluorocarbons Refrigerants Handbook", Ch. 3, Prentice-Hall, (1988), by R. C. Downing, which is incorporated herein by reference. The coefficient of performance, COP, is a universally accepted measure, especially useful in representing the relative thermodynamic efficiency of a refrigerant in a specific heating or cooling cycle involving evaporation or condensation of refrigerant. COP is related to or a measure of the ratio of useful refrigeration to the energy applied by the compressor in compressing the vapor and therefore expresses the capability of a given compressor to pump quantities of heat for a given volumetric flow rate of a heat transfer fluid, such as a refrigerant. In other words, given a specific compressor, a refrigerant with a higher COP will deliver more cooling or heating power.

Similarly the cooling capacity of a refrigerant is also an important parameter and can be estimated from the thermodynamic properties of the refrigerant. If the refrigerant is to be used in a system designed for another refrigerant, the capacity of the two refrigerant should be similar, in order to obtain a similar performance. The common refrigerants being used in refrigeration and air conditioning/heat pumps are R-507A, R-404A, R-22, R-407C and R-410A. The applicants have found that various composition of this invention can be used in the applications where these refrigerants are used with slight adjustments in composition.

As mentioned before, additional components known to those skilled in the art may be added to the mixture to tailor the properties of the heat transfer fluid according to the need.

The Methods and Systems

The method aspects of the present invention comprise transferring heat to or from a body using a heat transfer fluid in accordance with the present invention. Those skilled in the art will appreciate that many known methods may adapted f or use with the present invention in view of the teachings contained herein, and all such methods are within the broad scope hereof. For example, vapor compressions cycles are methods commonly used for refrigeration and/or air conditioning. In its simplest form, the vapor compression cycle involves providing the present heat transfer fluid in liquid form and changing the refrigerant from the liquid to the vapor phase through heat absorption, generally at relatively low pressure, and then from the vapor to the liquid phase through heat removal, generally at an elevated pressure. In such embodiments, the refrigerant of the present invention is vaporized in one or more vessels, such as an evaporator, which is in contact, directly or indirectly, with the body to be cooled. The pressure in the evaporator is such that vaporization of the heat transfer fluid takes place at a temperature below the temperature of the body to be cooled. Thus, heat flows from the body to the refrigerant and causes the refrigerant to vaporize. The heat transfer fluid in vapor form is then removed, preferably by means of a compressor or the like which at once maintains a relatively low pressure in the evaporator and compresses the vapor to a relatively high pressure. The temperature of the vapor is also generally increased as a result of the addition of mechanical energy by the compressor. The high pressure vapor then passes to one or more vessels, preferably a condenser, whereupon heat exchange with a lower temperature medium removes the sensible and latent heats, producing subsequent condensation. The liquid refrigerant, optionally with further cooling, then passes to the expansion valve and is ready to cycle again.

In one embodiment, the present invention provides a method for transferring heat from a body to be cooled to the present heat transfer fluid comprising compressing the fluid in a centrifugal chiller, which may be single or multi-stage. As used herein, the term "centrifugal chiller" refers to one or more pieces of equipment which cause an increase in the pressure of the present heat transfer fluid.

The present methods also provide transferring energy from the heat transfer fluid to a body to be heated, for example, as occurs in a heat pump, which may be used to add energy to the body at a higher temperature. Heat pumps are considered reverse cycle systems because for heating, the operation of the condenser is generally interchanged with that of the refrigeration evaporator.

The present invention also provides methods, systems and apparatus for cooling of objects or very small portions of objects to very low temperatures, sometimes referred to herein for the purposes of convenience, but not by way of limitation, as micro-freezing. The objects to be cooled in accordance with the present micro-freezing methods may include biological matter, electronic components, and the like. In certain embodiments, the invention provides for selective cooling of a very small or even microscopic object to a very low temperature without substantially affecting the temperature of surrounding objects. Such methods, which are sometimes referred to herein as "selective micro-freezing," are advantageous in several fields, such as for example in electronics, where it may be desirable to apply cooling to a miniature component on a circuit board without substantially cooling adjacent components. Such methods may also provide advantage in the field of medicine, where it may be desirable cool miniature discrete portions of biological tissue to very low temperatures in the performance of cryosurgery, without substantially cooling adjacent tissues.

Cryosurgery methods of the present invention include, but are not limited to, medical (such as gynecology, dermatology, neurosurgery and urology), dental, and veterinary procedures. Unfortunately, currently known instruments and methods for selective micro-freezing have several limitations which make their use difficult or impossible in such fields. Specifically, known systems do not always have sufficient precision and flexibility to allow their widespread use in endoscopic and percutaneous cryosurgery.

One major advantage of the present methods and systems is the ability to provide relatively low temperature cooling with systems and methods that require relatively simple equipment and/or require only moderately elevated pressures. By way of contrast, typical prior art cryosurgical methods used liquid nitrogen or nitrous oxide as coolant fluids. Liquid nitrogen is usually either sprayed onto the tissue to be destroyed, or it is circulated to cool a probe which is applied to the tissue. Liquid nitrogen has an extremely low temperature of approximately 77° K., and a high cooling capacity, making it very desirable for this purpose. However, liquid nitrogen typically evaporates and escapes to the atmosphere during use, requiring the continual replacement of storage tanks. Further, since the liquid is so cold, the probes and other equipment used for its application require vacuum jackets or other types of insulation to protect the surrounding tissue. This makes the probes relatively complex, bulky, and rigid, and therefore unsuitable for endoscopic or intravascular use. The need for relatively bulky supply hoses and the progressive cooling of all the related components make the liquid nitrogen instruments less than comfortable for the physician, as well, and they can cause undesired tissue damage. Furthermore, nitrous oxide systems used in cryosurgery pressurize the gas to 700 to 800 psia in order to reach practical cooling temperatures of no lower than about 190° K. to 210° K. In the preferred systems and methods of the present invention, particularly cooling apparatus use in the production of lasers, superconductors and electronics, and in cryosurgery, the system and methods operate effectively and with a high degree of efficiency using a heat transfer fluid of the present invention and a fluid let-down pressure less than about 420 psia.

In another embodiment, the compositions of this invention may be used as propellants in sprayable compositions, either alone or in combination with known propellants. The propellant composition comprises, more preferably consists essentially of, and, even more preferably, consists of the compositions of the invention. The active ingredient to be sprayed together with inert ingredients, solvents, and other materials may also be present in the sprayable mixture. Preferably, the sprayable composition is an aerosol. Suitable active materials to be sprayed include, without limitation, cosmetic materials such as deodorants, perfumes, hair sprays, cleansers, and polishing agents as well as medicinal materials such as anti-asthma and anti-halitosis medications.

Yet another embodiment of the present invention relates to a blowing agent comprising one or more compositions of the invention. In other embodiments, the invention provides foamable compositions, and preferably polyurethane and polyisocyanurate foam compositions, and methods of preparing foams. In such foam embodiments, one or more of the present compositions are included as a blowing agent in a foamable composition, which composition preferably includes one or more additional components capable of reacting and foaming under the proper conditions to form a foam or cellular structure, as is well known in the art. Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention.

In yet other embodiments, the invention provides foamable compositions comprising thermoplastic or polyolefin foams, such as polystyrene (PS), polyethylene (PE), polypropylene (PP) and polyethyleneterpthalate (PET) foams, preferably low density foams. Other uses of the present compositions include use as solvents for example as supercritical or high pressure solvents, deposition agents, extractants, cleaning agents, and the like. The present compositions find particular advantage in methods and systems involving aerosol compositions, particularly in medicinal compositions, cleaning composition, and other sprayable compositions. Those of skill in the art will be readily able to adapt the present compositions for use in such applications without undue experimentation.

EXAMPLES

The invention is further illustrated in the following examples, which are intended to be illustrative, but not limiting in any manner.

Example 1

Figure 2:
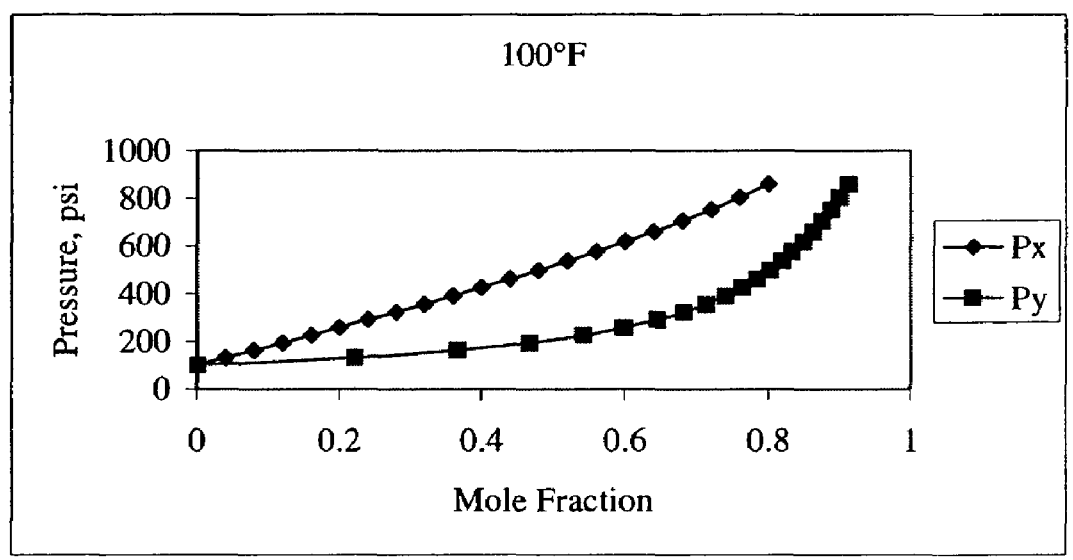
FIG. 2 is a graphical representation of the dew and bubble points of certain embodiments of the compositions of the present invention at 100° F.

The bubble (Px) and dew (Py) pressures of various mixtures of trans-HFO-1234ze and CO2 are given below at 32° F. (FIG. 1) and 100° F. (FIG. 2), as function of $CO_2$ mole fraction (composition). The fact that these pressures for any of the mixture compositions are intermediate between that of the pure components and are neither above nor below those of the pure components indicates that these compositions are non-azeotropic.

Comparative Example 1

This example illustrates the performance characteristics of a heat transfer fluid consisting of certain preferred compositions of the present invention compared to that of R-507A and R-404A, two refrigerants commonly used in low temperature and commercial refrigeration.

Figure 3:
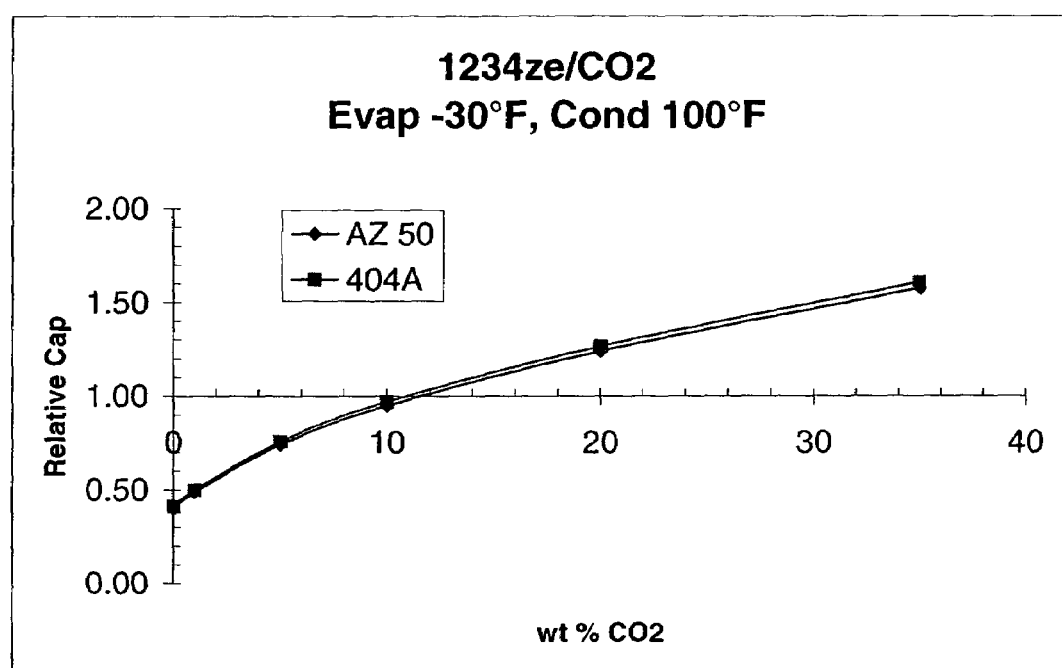
FIG. 3 is a graphical representation of test results showing the performance of a certain embodiment of the compositions of the present invention in comparison to previous compositions.

The test conditions are as follows:
Mean Evaporator temp −30° F.
Mean Condenser temp 100° F.
Compressor displacement 10 ft3/min The results are illustrated in FIG. 3. Under the conditions of the present test, it is observed that a good capacity match is obtained by a preferred composition of the present invention in comparision to R-404A and R-507A (also known as AZ-50) at 8 to 14 wt % CO2 (92 to 86 wt % transHFO-1234ze) composition.

Comparative Example 2

Figure 4:
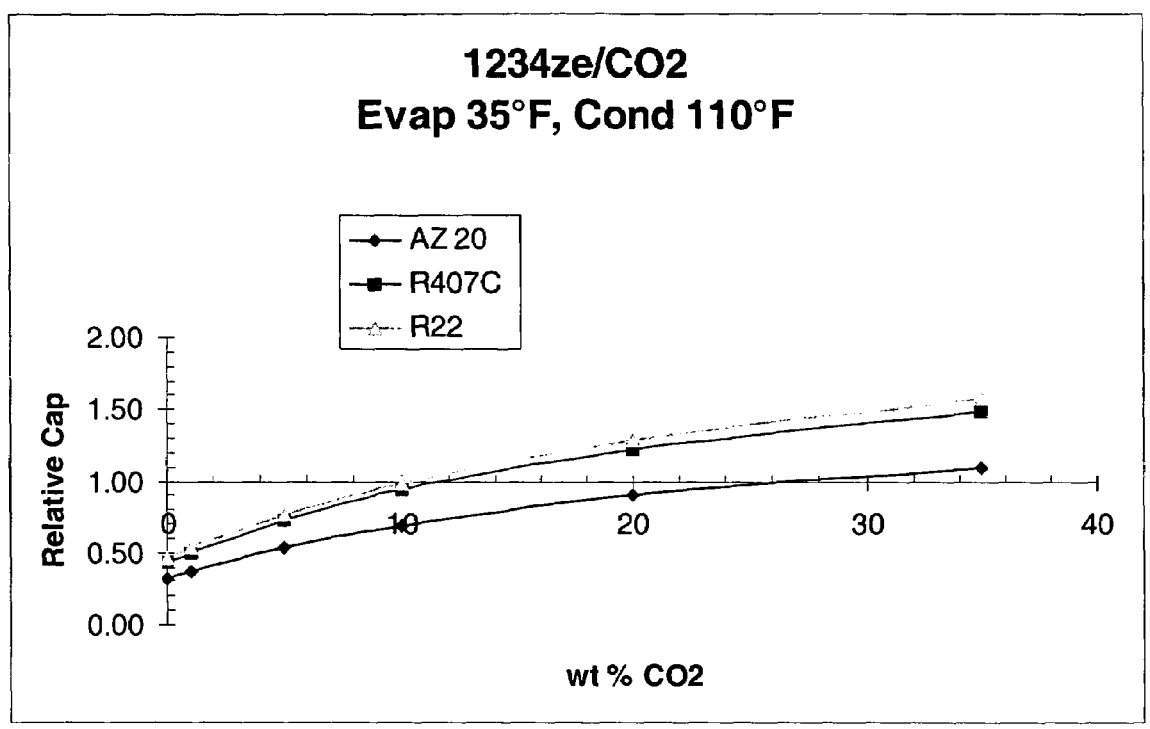
FIG. 4 is a graphical representation of test results showing the performance of a certain embodiment of the compositions of the present invention in comparison to previous compositions.

This example illustrates the performance characteristics of a heat transfer fluid consisting of preferred compositions of the present invention compared to that of R-410A (also known as AZ-20), R-407C and R-22, three refrigerants commonly used in air conditioning, heat pumps and chillers. The test conditions are as follows:

Mean Evaporator temp 35° F.
Mean Condenser temp 110° F.
Compressor displacement 10 ft3/min The results are given in FIG. 4. Under the conditions of the present test, it is observed that a good capacity match is obtained with R-22 and R-407C in comparison to certain preferred compositions of the present invention, namely 8 to 16 wt % CO2 (92 to 84 wt % HFO-1234ze), and that a good capacity match is obtained with R-410A (also known as AZ-20) in comparison to certain preferred compositions of the present invention, namely, 20 to 35 wt % CO2 (80 to 65 wt % transHFO-1234ze).

It is apparent that many modifications and variations of this invention as hereinabove set forth may be made without departing from the spirit and scope thereof. The specific embodiments are given by way of example only and the invention is limited only by the terms of the appended claims.

What is claimed is:

1. A blowing agent comprising from about 1 to about 40 percent by weight of carbon dioxide ($CO_2$) and from about 99 to about 60 percent by weight of one or more compounds of Formula I $XCF_zR_{3-z}$ (I), where X is a $C_2$ or a $C_3$ unsaturated, substituted or unsubstituted radical, each R is independently Cl, F, Br, I or H, and z is 1 to 3.

2. The blowing agent of claim 1 wherein said one or more compounds of Formula I comprises trans-1,1,1,3-tetrafluoropropene (HFO-1234ze).

3. The blowing agent of claim 2 wherein said $CO_2$ is present in an amount of about 5 to about 30 percent by weight and said trans-1,1,1,3-tetrafluoropropene is present in an amount of about 70 to about 95 percent by weight.

4. The blowing agent of claim 1 wherein said blowing agent is non-flammable.

5. The blowing agent of claim 1 having a vapor pressure of at least about 30 psia at 35° F.

* * * * *